455-612 AU 233 EX
FIP8106 XR 2,714,660
Stark Effect
Aug. 2, 1955     W. D. HERSHBERGER     2,714,660
FREQUENCY STABILIZATION METHOD AND
SYSTEM EMPLOYING STARK EFFECT
Filed Jan. 31, 1948     4 Sheets-Sheet 1
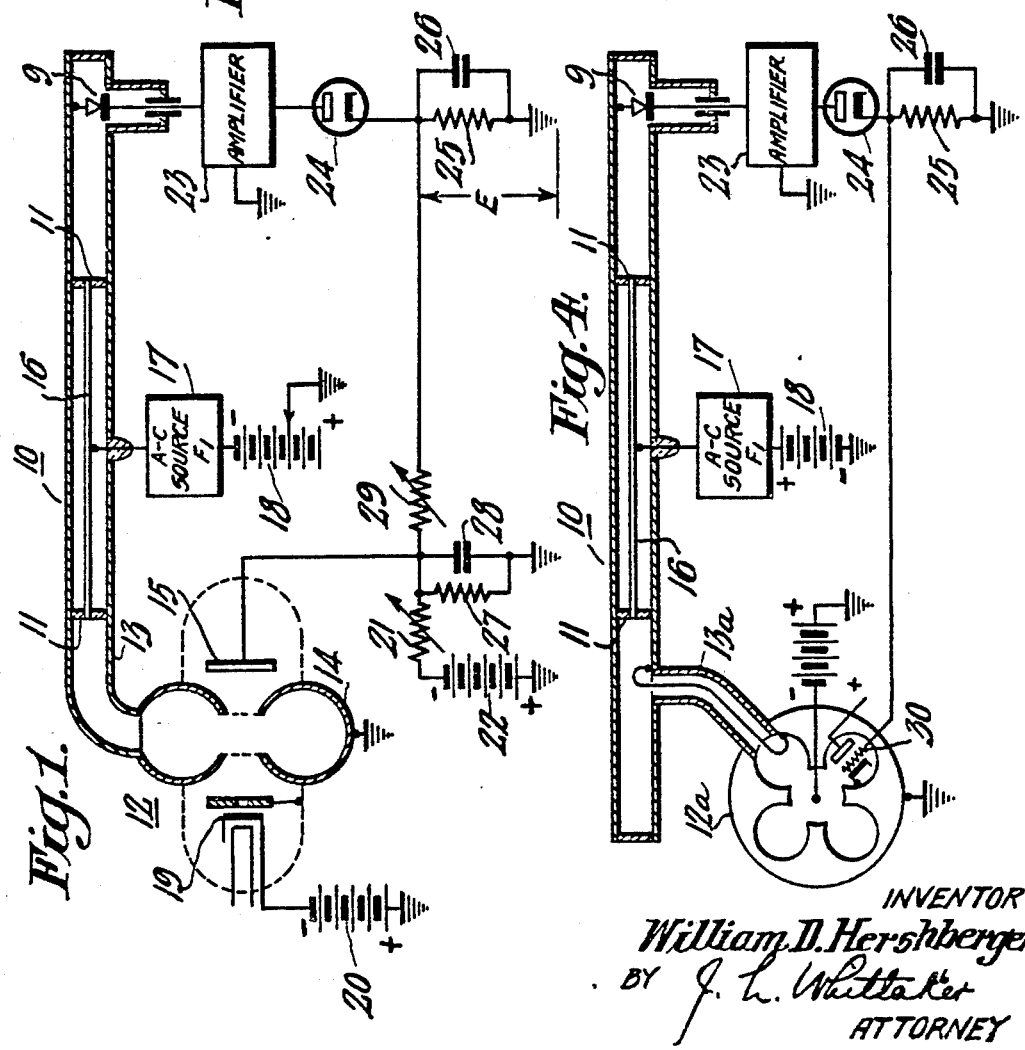
INVENTOR
*William D. Hershberger*
BY *J. L. Whittaker*
ATTORNEY

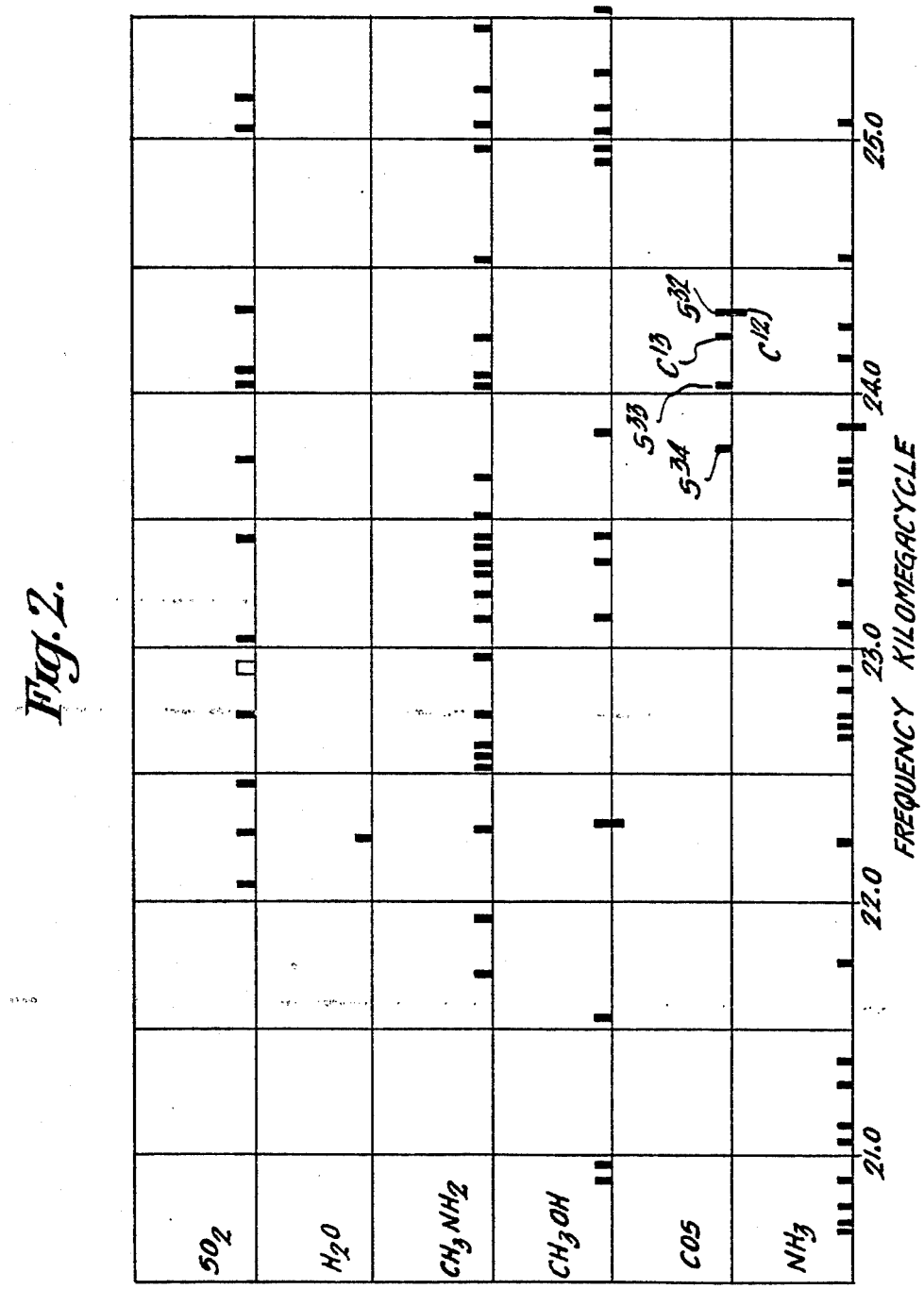

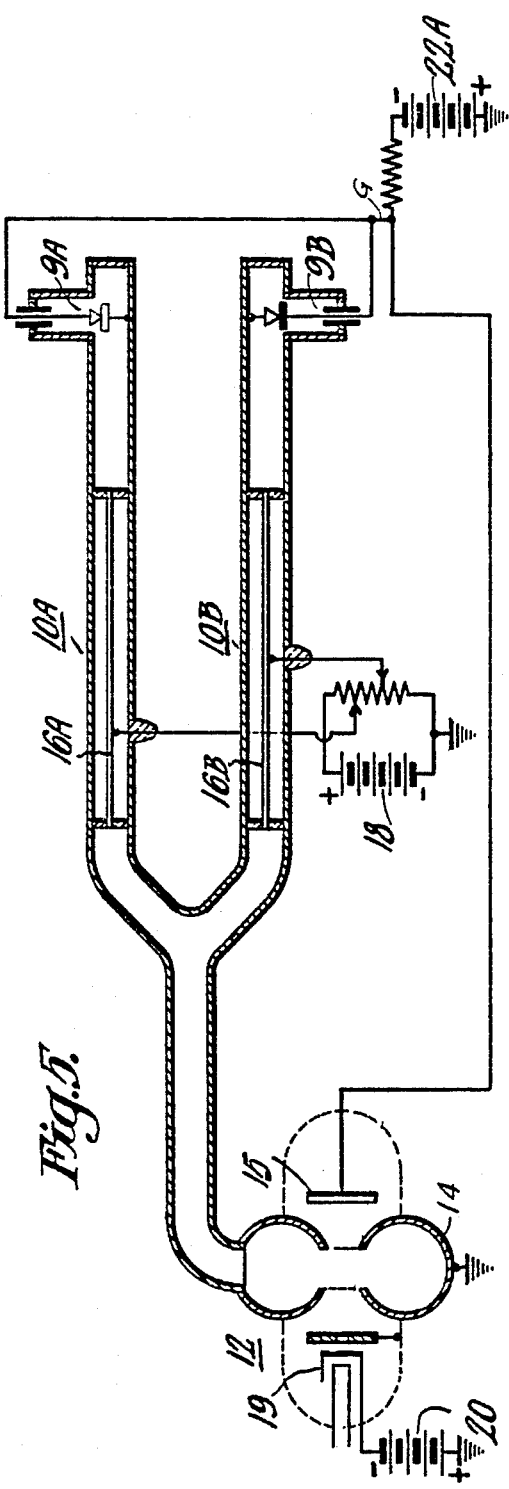
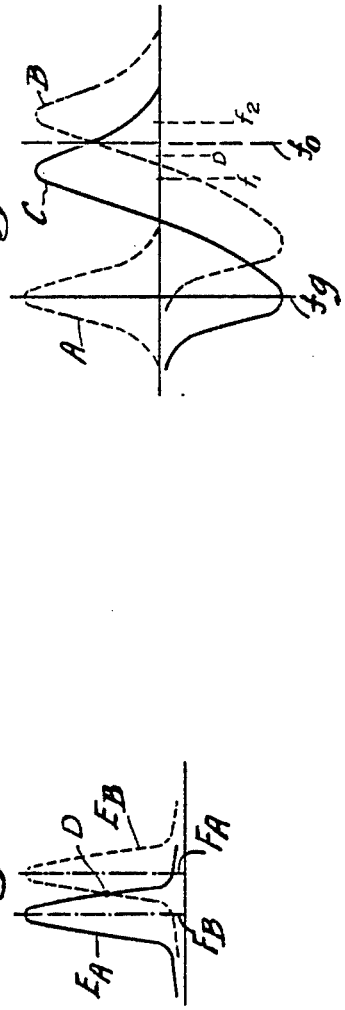

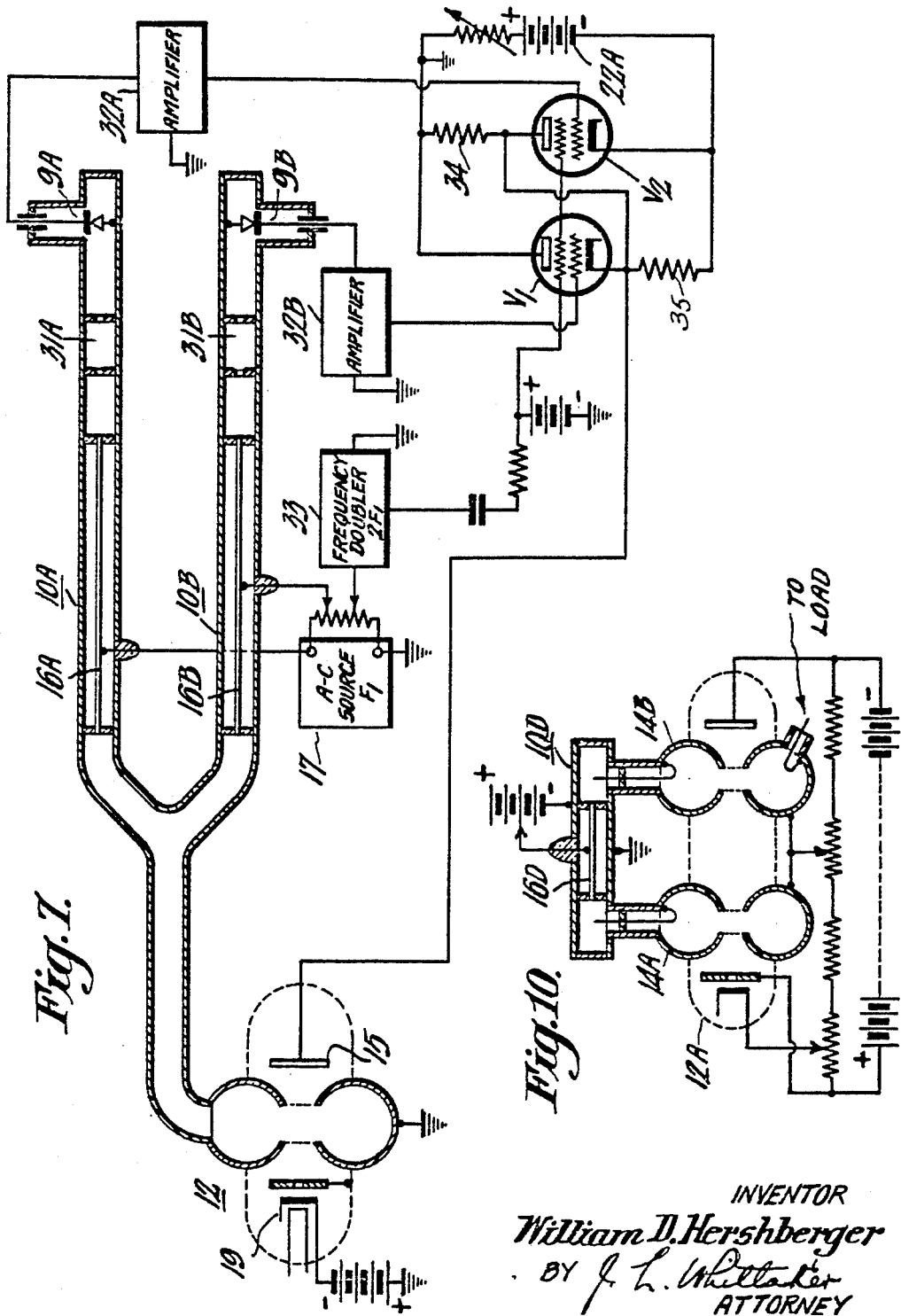

United States Patent Office 2,714,660
Patented Aug. 2, 1955

2,714,660

FREQUENCY STABILIZATION METHOD AND SYSTEM EMPLOYING STARK EFFECT

William D. Hershberger, Princeton, N. J., assignor to Radio Corporation of America, a corporation of Delaware Application January 31, 1948, Serial No. 5,563

6 Claims. (Cl. 250—36)

This invention relates to the stabilization of microwave oscillators, and particularly relates to the utilization for such purpose of the effect of strong electric or magnetic fields upon molecular resonance exhibited by certain gases.

Among the objects of the invention are to provide improved methods of and means for stabilizing the frequency of microwave energy with respect to molecular resonance phenomena in microwave absorptive gases. Another object is to utilize the "Stark effect" to provide frequency stabilization of a microwave energy source. A further object is to provide improved methods of and means for generating microwaves having high frequency stability. Other objects will be apparent from the following descriptions of suggested embodiments of the invention.

At low pressures the microwave spectra of certain gases, including ammonia, carbonyl sulphide and methyl halides, comprise "lines" of distinctive and different frequency distribution for different gases. As employed herein, the term "molecular resonance" defines the characteristics or properties of an aggregation of gas molecules which give rise to the selective absorption of electromagnetic microwaves of a definite frequency or frequencies.

In accordance with the present invention, a microwave oscillator is stabilized by impressing output energy therefrom upon one or more gas cells containing gas which exhibits molecular resonance at or near the desired operating frequency of the oscillator and whose molecular resonance is displaced or shifted by a control field produced in the gas cell by application of a potential to a Stark field electrode therein.

In accordance with some forms of the invention, the potential applied to the Stark electrode alternates at frequency low compared to the oscillator frequency to produce amplitude-modulation of oscillator energy passed by the gas cell, the percentage of modulation depending upon the relation of the oscillator frequency to the normal or undisplaced molecular resonance frequency of the gas. The output of the gas cell is used to vary a unidirectional voltage applied to an electrode of the oscillator in sense to return the oscillator frequency toward the desired value thereof.

In other forms of the invention, output energy of the oscillator is transmitted through two cells exhibiting molecular resonances at different frequencies, either or both determined by the potential of a Stark electrode, which are respectively slightly higher and slightly lower than the desired operating frequency of the oscillator. Depending upon the type of associated control circuit, the potentials applied to the Stark electrodes may be unidirectional or alternating, preferably the latter. In either case, the differential output of rectifiers respectively associated with the gas cells is employed to regulate the oscillator frequency.

In still other forms of the invention, the gas cell is used as a highly reactive load which exerts a strong "pulling" effect upon the oscillator to stabilize it at an operating frequency determined by a unidirectional potential applied to the Stark electrode.

In still another form of the invention, the gas cell is included in an external feedback path between electrodes of the oscillator tube to vary the phase of the feedback in compensation for departure of the frequency of the generated oscillations from a frequency of molecular resonance of the gas determined by the chosen magnitude of a unidirectional potential applied to the Stark electrode.

The invention further resides in methods and systems having features hereinafter described and claimed.

For a more detailed understanding of the invention and for illustration of various forms thereof, reference is to be had to the accompanying drawings in which:

Figure 1 is a schematic diagram of a stabilized microwave oscillator using one gas cell;

Figure 2 is a table showing molecular resonance frequencies of various gases within part of the microwave spectrum;

Figures 3A, 3B and 3C are response curves referred to in discussion of Figures 1 and 4;

Figure 4 illustrates the system of Figure 1 as applied to another type of microwave oscillator tube;

Figure 5 is a schematic diagram of a stabilized microwave oscillator system using two gas cells;

Figure 6 is an explanatory figure referred to in discussion of Figure 5;

Figure 7 schematically illustrates another stabilized microwave oscillator system using two gas cells;

Figure 8 is an explanatory figure referred to in discussion of Figure 7; and

Figures 9 and 10 are schematic diagrams of two other forms of stabilized microwave oscillator systems.

In explanation of phenomena utilized for stabilization of frequency by the present invention, it is known there are a number of gases, including $NH_3$, COS, $CH_3OH$, $CH_3NH_2$ and $SO_2$, which exhibit selective absorption in the microwave region of the frequency spectrum. From measurements of the "resonant" frequency of such a gas, it is known the magnitude of the absorption coefficient is quite independent of the gas pressure but that the apparent width of the absorption line decreases substantially linearly with reduction of pressure: specifically, at a wavelength of 1.25 centimeters (24,000 mc.), the Q of the ammonia line is approximately 10 when the gas pressure is $1/10$ of an atmosphere; is 100 at $1/100$ of an atmosphere, etc. However, as the pressure is further and further reduced to the order of millimeters, the absorption line in the case of ammonia breaks up into a plurality of sharply defined component lines each precisely corresponding with a particular frequency. As shown in Figure 2, even a relatively few gases provide a substantial number of precise frequency lines in that portion of microwave region between 20.5 and 25 kilomegacycles.

When such gas is subjected to a strong electric or magnetic field, many of these lines are displaced to extent directly related to the field intensity. The electric field effect, known as the Stark effect, is herein availed of in various ways for frequency-stabilization of microwave oscillators.

Referring to Figure 1, the gas cell 10 which may be a section of matched wave guide having windows 11, 11 for passage of microwave energy, is filled with a gas, preferably under reduced pressure of the order of 0.02 millimeter of mercury or less, exhibiting molecular resonance effects at or very close to the desired operating frequency of a microwave oscillator tube 12 coupled, as by wave guide 13, or equivalent transmission line, to the cell 10.

Specifically, the oscillator tube 12 is a reflex type of klystron comprising an electron-gun, an output cavity 14, and a reflector anode 15 whose potential may be varied to change the frequency of oscillations generated by the tube. At least part of the oscillator output is transmitted to and passed by the gas cell 10 to the crystal rectifier 9, or equivalent demodulator.

Within the gas cell 10, there is disposed a Stark electrode 16, which may be a rod or plate, electrically insulated from the guide walls and connected to a source 17 of alternating voltage whose frequency ($F_1$) is low compared to the oscillator frequency. In such case, the transmission through the cell 10 of microwave energy from oscillator is modulated in amplitude at twice the frequency $F_1$ applied to the Stark electrode if the Stark Effect is of the second order. If, in addition, the potential of the Stark electrode has a unidirectional component provided by a suitable direct-current source generically exemplified by battery 18, the modulation frequency is $F_1$ rather than twice $F_1$.

In either case, the demodulated output of gas cell 10 may be used for frequency-control purposes; it may, for example, be employed to vary the potential of reflector anode 15 in sense to compensate for deviations from the desired operating frequency.

By way of specific example, the cathode 19 of the klystron 12, Figure 1, is held by source 20 at 1600 volts negative with respect to ground with the output cavity 14 at ground potential. The reflector anode 15 is connected through resistor 21 to the negative terminal of the 1800 volt source 22 so that nominally the reflector is about 200 volts negative with respect to the cathode, but is variable in accordance with the output of rectifier 9 for stabilization of the oscillator frequency.

The rectifier output is impressed upon the receiver or amplifier 23 tuned to the modulation frequency $F_1$ or $2F_1$, depending upon whether the D. C. source 18 is or is not used—and whose output is rectified by diode 24, or equivalent, to produce a D. C. voltage drop across the resistor-condenser network 25, 26. The magnitude of this unidirectional voltage E varies with oscillator frequency as shown in Figure 3. Figure 3A represents the resonant response of the gas itself and attains a maximum value when the frequency of the impressed microwave corresponds with the normal molecular resonant frequency of the gas. The absorption characteristic, which produces voltage E appearing across the resistor condenser network 25, 26, varies as a function of frequency as shown in Figure 3B when the D. C. source 18 is not used, but may be given the form shown in Figure 3C when the D. C. source is additionally used.

The oscillator 12 is so adjusted that when source 22 is first turned on, the frequency of the generated oscillations is somewhat lower than frequency F and increases at rate determined by the time constant of the network 27, 28. As the oscillator-frequency approaches F, the control voltage appears across the network 25, 26 due to the Stark effect produced by the modulating frequency $F_1$. Equilibrium is reached when the opposing currents through resistor 27 respectively supplied by diode 24, through resistor 29 and by supply source 22 through resistor 21 are in balance. The resistors 21 and 29 are preferably so chosen or adjusted that balance or stabilization occurs at a steep part of the curve (Fig. 3C), i. e., at point D. When the klystron 12 attempts to oscillate at a lower frequency, there is less modulation of the oscillator energy traversing gas cell 10: consequently, the control voltage across resistor 25 decreases and the reflector anode therefore becomes more negative causing the frequency to rise. Conversely, if the klystron attempts to oscillate at a frequency above point D, there is a higher percentage of modulation of the oscillator energy by the Stark effect and the control voltage across resistor 25 increases, so decreasing the negative bias on the reflector anode 15 with consequent decrease of frequency. Thus, the oscillator-frequency is constantly monitored at the modulating frequency $F_1$ (or twice $F_1$) and is held, within extremely narrow limits, to the frequency F.

For optimum stability, this system requires that the voltage supply 22 be stable or stabilized and that resistors 21, 25, 27 and 29 be stable. The time constants of networks 25, 26 and 27, 28 are chosen to be sufficiently large to stabilize the system against transient perturbing influences, which would otherwise tend to affect the oscillator frequency.

The control-range of the voltage curve can be controlled by selection or adjustment of the amplitude of the modulating voltage. By way of example, for the 3, 3 line of ammonia, application of an alternating field having a crest to crest magnitude of 1000 volts per centimeter will cause the line to swing over a range of about 12 megacycles, about a mean value of 23,870.1 megacycles, affording a control range of 6 megacycles within which the oscillator-frequency may be held constant.

The same method and system may be used to stabilize the frequency of a magnetron, particularly and most conveniently a magnetron of the type shown in Figure 4 having in one of its anode cavities an electrode 30 whose potential may be varied to change the frequency oscillations generated by the magnetron. As this type of magnetron is well known, its mode of operation need not be herein described: it suffices here to say that the potential of electrode 30 is automatically varied generally as above described in discussion of Figure 1 to maintain the operating frequency of the magnetron very close to a frequency at which the gas in cell 10 exhibits molecular resonance. It shall, of course, be understood that either side of the curves 3A—3C may be used for control purposes, depending upon which is suited to the characteristics of the particular type of oscillator tube and the sense in which the control voltage should be varied to compensate for deviations of the oscillator frequency.

In the system shown in Figure 5, microwave energy from the output cavity of the klystron 12 is impressed upon a pair of gas cells 10A, 10B containing bodies of gas exhibiting molecular resonance at slightly different microwave frequencies $F_A$ and $F_B$, Figure 6, respectively lower and higher than the desired operating frequency of the klystron 11 or other microwave oscillator to be stabilized. This relation may be effected by using the same gas in both cells and adjusting the potential of the Stark electrode of one or both of the cells. The feasibility of using different gases in the different gas cells and displacing the absorption curve of either or both of them greatly increases the number of frequencies at which stabilization can be effected by utilization of overlapping molecular resonances of two bodies of gas. In this connection, it is noted, by way of illustration, that for ammonia the frequency of a line is shifted to a higher frequency upon application of a Stark field regardless of the polarity of the field, and for the 3, 3 line, the frequency is increased by about 12 megacycles for a Stark electrode potential of about 1000 volts per centimeter. In general, the displaced frequency ($f$) may be expressed as $$f = f_0 + \beta e^2$$

where $f_0$ is the undisplaced or normal frequency, $\beta$ is an empirical constant which depends upon the particular gas employed, and $e$ is the potential of the Stark field electrode.

By way of example, the 3, 3 line of ammonia in the cells 10A and 10B may be shifted by selection or adjustment of the unidirectional potential applied to the Stark electrodes 16A, 16B so that the gas in the cell 16A exhibits resonance at 23,875 megacycles ($F_A$) and the gas in cell 16B is resonant at 23,874.5 megacycles ($F_B$). Consequently, when the oscillator-frequency is at the control point D, Figure 6, the differential voltage output of the two oppositely poled rectifiers 9A and 9B is zero and the voltage of the reflector anode 15 of the klystron is determined solely by the source 22A. When, however, the oscillator-frequency rises above or falls below the control point, the differential output voltage of the rectifiers 9A, 9B is not zero but of polarity and magnitude dependent upon the sense and extent of the frequency deviation. In such case, the reflector voltage is the algebraic sum of the voltage of source 22A and the differential voltage of the rectifiers 9A, 9B. The poling of the rectifiers is, of course, so chosen that their differential output changes in proper sense to return the oscillator frequency toward the control point.

The sensitivity of the control may be enhanced by interposition of a D. C. amplifier at the point G between the rectifiers 9A, 9B and the reflector anode circuit but it is generally more desirable for such purpose to use A. C. amplifiers, Figure 7, in a modified system in which the Stark effect is produced by an alternating voltage $F_1$.

In this system, Figure 7, different alternating voltages of the same frequency, 100 kilocycles, for example, are applied to the Stark electrodes 16A and 16B.

For purpose of explanation, it is assumed the higher voltage is applied to electrode 16A so that the resonant frequency of cell 10A is shifted back and forth over a wider range than the resonant frequency of cell 10B.

Curve A of Fig. 8 represents the resonant response of the gas itself and attains a maximum value when the frequency of the impressed microwave corresponds with the normal molecular resonant frequency $f_g$ of the gas. Curve B of Fig. 8 represents the amplitude as a function of frequency of the sidebands generated on simultaneous application of a microwave frequency field and a 100 kc. Stark field to the gas in the neighborhood of $f_g$ in 16A while curve C of Fig. 8 represents the corresponding sideband amplitude in 16B. These two sideband amplitude curves have a crossover point at frequency $f_0$ which is the operating frequency of the system at which stabilization takes place. Use of filters, such as resonant cavities 31A and 31B serve to pass power at frequencies $f_1$ and $f_2$ in the neighborhood of $f_0$ to the input detectors 9A and 9B and eliminate power of frequency $f_g$ from the detectors. The outputs of the rectifiers may be amplified by the alternating voltage amplifiers 32A and 32B and as amplified are applied to the control grids of tubes $V_1$ and $V_2$. Upon the screen grids of tubes $V_1$ and $V_2$ is impressed the output voltage of a frequency doubler 33 connected to the source 17 of a modulating frequency $F_1$.

The internal anode-cathode circuits of tubes $V_1$ and $V_2$ are respectively in shunt to resistors 34, 35 connected in series across the source 22A of voltage supply for the reflector anode 15 of the klystron 12, or for the equivalent frequency-control electrode of the particular microwave oscillator to be stabilized. The tubes $V_1$, $V_2$ and resistors 34, 35 provide a voltage-divider network for supplying to the oscillator-electrode 15 a voltage corresponding with the IR drop across resistor 35.

In a preferred arrangement, using resistors 34, 35 of equal magnitude, the cavity tuning and the steady electrode potentials are so adjusted that the currents through the control tubes $V_1$ and $V_2$ are equal when the oscillator is operating at a frequency D, Figure 8, midway between frequencies $f_1$ and $f_2$. If the oscillator-frequency departs from frequency D, the output of one or the other of the rectifiers 9A, 9B increases and the other decreases cumulatively to vary the current traversing resistor 35 in sense to return the oscillator-frequency to the desired value.

By selection or adjustment of the magnitude of the modulating voltage producing the Stark effect, stabilized operation may be attained at any one of many frequencies displaced from a normal molecular resonance frequency of a gas. In general, the Stark effect should be made large enough to facilitate selection of frequencies $f_1$ and $f_2$ by the filters 31A and 31B.

In the system shown in Figure 9, the gas cell 10C is a cavity which is resonant, at fundamental or higher mode of excitation, at the desired operating frequency of magnetron 12B and which contains gas exhibiting molecular resonance at that frequency because of the Stark effect as obtained, for example, by applying a unidirectional voltage to the electrode 16C within the gas cell.

When an absorbing gas is placed in a cavity the effect is to reduce transmission through the gas. At reduced pressure such that the Q of the gas is of the order of 100,000, where Q is determined by the band width of the gas absorption line, such reduction in transmission occurs over but a narrow range of frequency.

Under this circumstances as more fully discussed in my copending application Serial No. 1240 filed January 8, 1948, by William D. Hershberger and entitled Use of Molecular Resonance in a Gas, the cavity containing the gas may be suitably coupled to a magnetron to exert a strong "pulling" effect insuring operation of the oscillator at the desired frequency. With the arrangements disclosed in that application, stabilization is effected at the relatively few precise frequencies corresponding with the normal resonant frequencies of a gas, whereas by utilization of the Stark effect in any of the arrangements therein disclosed, this type of reactive control may, in accordance with the present invention, be extended to bands of frequencies.

Except for utilization of the Stark effect, the system shown in Figure 10 is similar to and exemplary of feedback types of frequency-control disclosed in copending application Serial No. 5603 filed January 31, 1948, Patent No. 2,559,730, by Lowell E. Norton and entitled Methods of and Systems for Stabilizing Microwave Oscillations. In brief, the gas cell 10D is a resonant cavity connected in the feedback path between the cavities 14A and 14B of the multi-cavity klystron 12A and contains a gas exhibiting sharp molecular resonance at the desired operating frequency of the klystrons. As more fully discussed in the aforesaid application, a shift in frequency of the klystron causes the high-Q cavity 10D to shift the phase of the feedback in sense to correct the frequency deviation. In accordance with the instant invention, the gas cell 10D in the feedback path is provided with a Stark electrode 16D to which a unidirectional potential may be applied to displace a molecular resonance frequency of the gas to a desired operating frequency of the oscillator which does not correspond with any of the normal resonance frequencies of available gases.

In any of the foregoing systems, the oscillator frequency may be modulated at audio or video frequencies, but in such case the Stark modulating frequency $F_1$ of Figures 1, 4, 5 and 7 should be low compared to he lowest audio or video frequency.

From the foregoing explanation, it shall be understood the invention is not limited to the specific arrangements disclosed and that changes and modifications may be made within the scope of the appended claims.

What is claimed is:

1. The method of stabilizing the frequency of a microwave generator which comprises impressing the generated oscillations upon two bodies of gas exhibiting molecular resonance, applying to each of said bodies of gas an alternating potential of lower frequency to shift their molecular resonances through overlapping frequency ranges including the desired frequency of said oscillations and so modulate the oscillator energies respectively passed by said bodies of gas, and demodulating said energies jointly to provide for said oscillator a control voltage varying in sense and magnitude dependent upon the sense and extent of deviation of the frequency of said oscillations from their desired frequency.

2. A control system for stabilizing the frequency of a microwave oscillator comprising two gas cells exhibiting molecular resonance within the operating frequency range of said oscillator, means for impressing output energy from said oscillator upon said gas cells, a Stark field electrode in each of said gas cells, means including a source of voltage for shifting the molecular resonance frequencies of said cells to frequencies slightly higher and lower than the desired operating frequency of said oscillator, and means including demodulatiors respectively associated with said cells for jointly producing a frequency-control voltage for said microwave oscillator.

3. A control system in accordance with claim 2 in which the source of voltage is a unidirectional source for displacing the normal molecular resonances to different fixed extents.

4. A control system in accordance with claim 2 in which the gas cells include different gases having molecular resonances at different frequencies and in which the source of voltage is of alternating frequency low relative to the oscillator-frequency and shifts the molecular resonance frequencies over overlapping ranges of frequency.

5. A control system as in claim 2 in which the same gas is in both cells and in which the source of voltage includes means for applying direct-current voltages of different magnitudes to the Stark electrodes to shift a molecular resonance of the gas to different extent for the two cells and for applying to said electrodes an alternating voltage which varies the moleciular resonance frequencies of the cells through overlapping ranges of frequency.

6. A microwave arrangement comprising a microwave oscillator, a chamber confining at low pressure a gas exhibiting molecular resonance at a frequency in the generation range of said oscillator, said chamber having Stark field electrode structure, means including a source of voltage connected to said electrode structure for displacing said frequency in the generation range of the oscillator, and a wave transmission path between said oscillator and said chamber for transmitting to the gas microwave energy generated by said oscillator and for re-transmitting over said same path a control effect to said oscillator from said gas for effecting control of the frequency of said oscillations by variation of the reactance of the gas.

No references cited.